United States Patent [19]

Sigg et al.

[11] Patent Number: 4,562,909
[45] Date of Patent: Jan. 7, 1986

[54] CLUTCH DEVICE FOR MARINE VESSEL DRIVE

[75] Inventors: Hans Sigg, Mutschellen; Otto Staedeli, Menzingen, both of Switzerland

[73] Assignee: MAAG Gear-Wheel & Machine Company Limited, Zürich, Switzerland

[21] Appl. No.: 573,219

[22] Filed: Jan. 23, 1984

[30] Foreign Application Priority Data

Jan. 24, 1983 [CH] Switzerland ............... 373/83

[51] Int. Cl.$^4$ .................. F16D 23/02; F16D 47/00
[52] U.S. Cl. .................. 192/48.91; 192/3.26; 192/3.27; 192/48.8; 192/67 A; 74/720
[58] Field of Search ............ 192/3.26, 3.27, 48.7, 192/48.8, 48.9, 48.91, 51, 53 H, 67 A, 70.21; 74/720

[56] References Cited

U.S. PATENT DOCUMENTS

| 2,770,979 | 11/1956 | Sinclair | 192/67 A |
|---|---|---|---|
| 3,189,148 | 6/1965 | Sinclair et al. | 192/67 A |
| 3,333,663 | 8/1967 | Clements et al. | 192/53 H X |
| 3,362,514 | 1/1968 | Clements | 192/67 A X |
| 3,563,354 | 2/1971 | Sigg . | |
| 3,620,336 | 11/1971 | Clements et al. | 192/67 A X |

FOREIGN PATENT DOCUMENTS

| 188172 | 2/1956 | Fed. Rep. of Germany ... 192/48.91 |
|---|---|---|
| 1959184 | 5/1973 | Fed. Rep. of Germany . |
| 2334926 | 11/1978 | Fed. Rep. of Germany . |

OTHER PUBLICATIONS

Marine Reversing Gear Incorporating Single Reversing Hyd. Coupling and Direct Drive Clutch for Each Turbine, E. Fortunato and H. A. Clements, Publication 79-GT-61, ASME, New York, 1979.

*Primary Examiner*—A. Michael Chambers
*Assistant Examiner*—John C. Fox
*Attorney, Agent, or Firm*—Werner W. Kleeman

[57] ABSTRACT

Two clutches are disposed between a driving shaft and a driven shaft, in particular a first synchronous clutch which automatically engages when the driven shaft overtakes the driving shaft and a second synchronous clutch which automatically engages when the driving shaft overtakes the driven shaft. As long as there is no external intervention the two clutches mutually protect one another against unintentional engagement. The clutch arrangement can only be put into a ready or enabled position by the action of an external force. From the ready position, the paired synchronous clutches can effect a torque transmitting connection between a driving shaft and a driven shaft when their rotational speeds are synchronous.

6 Claims, 16 Drawing Figures

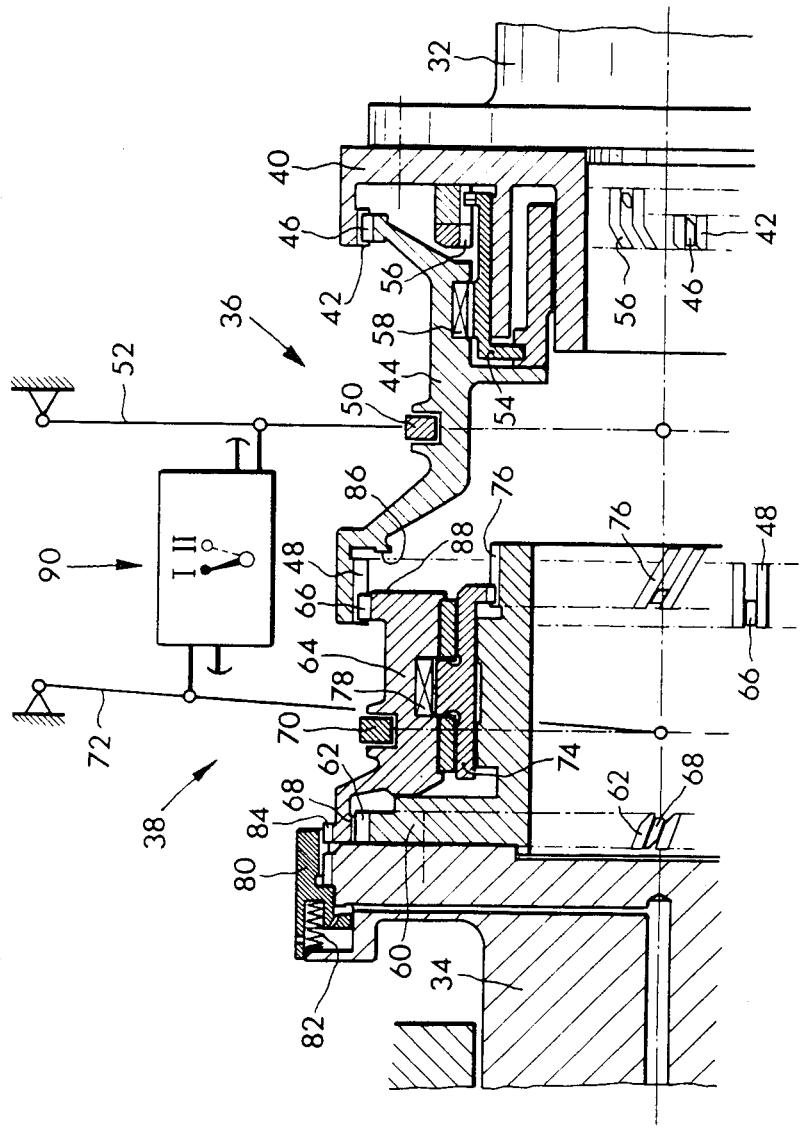

CLUTCH DEVICE FOR MARINE VESSEL DRIVE

BACKGROUND OF THE INVENTION

The present invention broadly relates to clutch devices and, more specifically, pertains to a new and improved construction of a clutch device for marine vessels.

Generally speaking, the clutch device of the present invention is of the type comprising a synchronous clutch disposed between a driving shaft and a driven shaft and which automatically engages when the driving shaft overtakes the driven shaft.

Reversing drive units for ships are known in which a synchronized dog clutch or toothed clutch and a hydraulic torque converter with adjustable stator vanes are arranged in parallel power transmission paths between a drive pinion and a main drive gear. Such an arrangement is described in ASME Publication 79-GT-61 of THE AMERICAN SOCIETY OF MECHANICAL ENGINEERS, New York, 1979. For normal forward propulsion the hydraulic torque converter is locked out by the clutch to avoid power losses due to slip. When maneuvering, the clutch must be disengaged so that the torque converter can operate the driven shaft faster or slower than the driving shaft as desired.

As soon as normal forward propulsion is required again, the clutch must be capable of automatically reengaging at any speed of rotation; the clutch must therefore be provided with a synchronizing device. Such devices preferably comprise ratchet wheels and pawls such as are disclosed in German Pat. No. 1,959,184, published July 23, 1970. In order that the rotational speed of the driven shaft can be increased or reduced in relation to that of the driving shaft when maneuvering, devices of this type have been developed in which the pawl mechanism can be axially shifted away from the ratchet wheel so that the dog clutch or toothed clutch is fully disengaged regardless of the relative speeds of rotation of the shafts. Such a device is disclosed in German Patent Publication No. 2,334,926, published Jan. 31, 1974, especially FIGS. 1 and 2.

The inactivation or disabling of a ratchet drive by axially shifting the pawls out of engagement has the disadvantage that the pawls may only be shifted back into their active or enabled position when the driving shaft is rotating slower than the driven shaft. Otherwise a ratchet drive would be immediately destroyed upon reentering the active position and the dog clutch or toothed clutch could not be re-engaged. It is also necessary to reliably monitor the rotational speeds of the driving and driven shafts and to determine a relative speed of rotation. While it is not difficult, for instance with electronic means, to monitor rotational speeds and to determine relative rotational speeds, errors are always possible and there is therefore always the danger that a toothed clutch with axially shifting pawls could be damaged by erroneous selection and become inoperable.

On the basis of these considerations a mechanical device has been designed and disclosed in the ASME Publication 79-GT-61, FIG. 11 which prevents shifting the pawls back when the driving shaft is rotating faster than the driven shaft, i.e. the relative speed of rotation is positive. This device comprises a friction ring which assumes different positions at positive and negative relative speeds of rotation and limits the mobility of the pawls at positive speeds of rotation to exclude the possibility of destruction of the ratchet drive due to erroneous selection. The friction forces required on this friction ring are very small and at lower speeds of rotation they tend to zero. The operation of the friction ring can therefore be disturbed by minor foreign particles. The friction ring of the known device and its cooperating components are also sensitive to vibrations and shocks.

Considerations similar to those presented here also apply to other propulsion drive systems, for instance CODAG marine drive arrangements in which a diesel motor is combined with a gas turbine.

An example of an automatically engageable and disengageable clutch is disclosed in the commonly assigned U.S. Pat. No. 3,563,354, granted Feb. 16, 1971, and listing as the inventor Hans Sigg.

SUMMARY OF THE INVENTION

Therefore, with the foregoing in mind, it is a primary object of the present invention to provide a new and improved construction of a clutch device which does not have associated with it the aforementioned drawbacks and shortcomings of the prior art constructions.

Another and more specific object of the present invention aims at providing a new and improved construction of a clutch of the previously mentioned type which is less subject to operational breakdown and less endangered by erroneous external influences than are the aforementioned known arrangements.

According to the invention, the latter object is realized by arranging the synchronous clutch as a second synchronous clutch following a first synchronous clutch which automatically engages when the rotational speed of the driven shaft exceeds that of the driving shaft.

This has the result that both synchronous clutches mutually protect each other against unintentional engagement as long as they are not subjected to external intervention. Only the action of an external force can put the clutch device into a ready or enabled position from which both synchronous clutches can effect a torque transmitting connection between the driving shaft and the driven shaft when they are rotating synchronously.

The clutch arrangement according to the invention preferably comprises toothed synchronous clutches known per se and assembled in such manner that:

the first synchronous clutch substantially comprises;

a clutch driving member or body mounted on the driving shaft and provided with toothed engagement means;

a primary clutch ring or coupling sleeve having toothed engagement means at its face or side nearest the driving shaft for engaging the toothed engagement means of the clutch driving body and further toothed engagement means at its face or side nearest the driven shaft; and a primary synchronizing device disposed between the primary clutch sleeve and the clutch driving body and comprising a primary synchronizing hub having a primary synchronizing ratchet drive;

the second synchronous clutch substantially comprises;

a clutch driven member or arbor mounted on the driven shaft and provided with toothed engagement means;

a secondary synchronous coupling sleeve having toothed means for slidably engaging the latter toothed engagement means and further toothed engagement means on its side nearest the driving shaft;

a secondary synchronizing device disposed between the secondary synchronous coupling sleeve and the clutch member or arbor and comprising a secondary synchronizing hub having a secondary ratchet drive; and the secondary synchronous coupling sleeve together with its toothed engagement means nearest the driving shaft is in constant axially slidably engagement with the toothed engagement means of the primary synchronous coupling sleeve nearest the driven shaft.

The primary embodiment of the invention preferably further comprises mutually butting or contact surfaces provided on each of the two synchronous coupling sleeves which prevent both coupling sleeves from simultaneously disengaging from the toothed engagement means of the two clutch members, i.e. the clutch body and the clutch arbor.

In a further embodiment of the invention the primary synchronous coupling sleeve comprises straight cut teeth or splines in its toothed engagement means nearest the driving shaft and in its toothed engagement means nearest the driven shaft and the secondary synchronous coupling sleeve comprises straight cut teeth or splines in its toothed engagement means nearest the driving shaft and oblique cut or helical teeth or splines in its toothed engagement means nearest the driven shaft and a servo-mechanism is associated with the primary synchronous coupling sleeve to effect its engagement in the toothed engagement means of the clutch body.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 2a through 2c show a longitudinal half section through the clutch device in various positions;

DETAILED DESCRIPTION OF THE PREFERRED EMBODIMENTS

Figure 1:
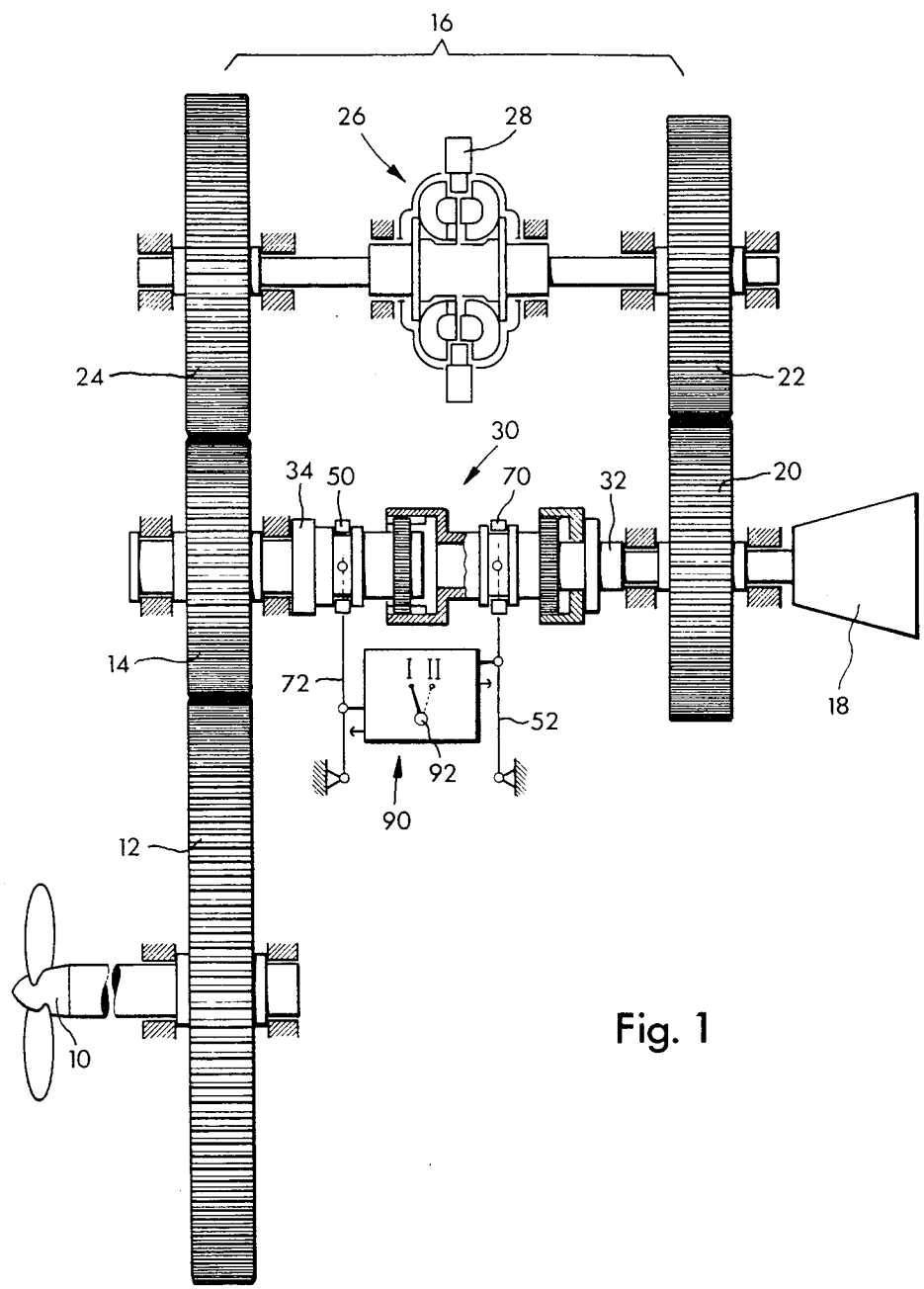
FIG. 1 shows a reversing drive unit for a marine vessel and employing the clutch arrangement according to the invention.

Describing now the drawings it is to be understood that to simplify the showing of the drawings only enough of the structure of the clutch device has been illustrated therein as is needed to enable one skilled in the art to readily understand the underlying principles and concepts of this invention. The illustrated exemplary embodiment of the clutch device or arrangement will be seen to comprise a reversing drive unit for a marine vessel driving a propeller 10 through a main drive gear 12 mounted on the shaft of the propeller and a pinion gear 14. According to the type of operation selected, the pinion 14 can be either directly driven by a gas turbine 18 or through a supplementary transmission or drive stage 16. A first gear wheel 20 is anchored to the shaft of the gas turbine 18 and meshes with a second gear wheel 22 of the same pitch diameter. The second gear wheel 22, together with a somewhat larger diameter third gear wheel 24 forms the supplementary drive stage 16. The gears 22 and 24 are united with one another by a hydraulic torque converter 26 having adjustable guide vanes 28. In parallel arrangement thereto the first gear 20 can be connected with the pinion gear 14 by means of an automatically synchronizing mechanical clutch arrangement 30.

The clutch arrangement 30 is disposed between a driving shaft 32 on which the first gear 20 is mounted and a driven shaft 34 on which the pinion 14 is mounted. According to FIGS. 2a through 2c, the clutch arrangement 30 is a combination of two synchronous clutches 36 and 38, each of which is in itself a synchronous clutch of the type commonly used in drive units for marine vessels.

The first synchronous clutch 36 comprises a first driving clutch member or body 40 permanently bolted to the driving shaft 32 and provided with toothed engagement means 42 structured as a straight toothed internal gear or female spline. A primary synchronous coupling sleeve 44 is rotatably and axially slidably mounted on the clutch driving member or body 40. Engine-side toothed engagement means 46 capable of slidably engaging the toothed engagement means 42 of the clutch body, i.e. also straight-toothed, and propeller-side toothed engagement means 48 in the form of a straight-toothed internal gear or female spline are formed in this primary synchronous coupling sleeve 44. The exterior of the primary synchronous coupling sleeve 44 is provided with grooved means for engaging an actuating fork or throw-out yoke mechanism 50 which is connected to a lever arm 52 swinging on a fixed pivot.

A synchronizing hub 54 is rotatably and axially slidably mounted on the first clutch drive member or body 40 in concentric relation thereto and to the primary synchronous coupling sleeve 44. This synchronizing hub 54 is connected to the primary synchronous coupling sleeve 44 to slide axially therewith and engages semi-helical toothed engagement means 56 provided on the first clutch drive member or body 40. The semi-helical engagement means 56 is composed of two annular members, the propeller-side member or the member nearest the driven shaft 34 having the form of a steeply pitched helical internal gear or female spline and the engine-side member or member nearest the driving shaft 32 having the form of a straight cut internal gear or female spline with teeth parallel to the axis of rotation.

The first synchronous clutch 36 also comprises a primary ratchet drive 58 concentrically arranged between the primary synchronous sleeve 44 and the primary synchronizing hub 54. This primary ratchet drive 58 is so structured that the engine-side toothed engagement means 46 of the primary synchronous coupling sleeve 44 engages the toothed engagement means 42 of the first clutch drive member or body 40 when the driving shaft 32 drives the synchronous clutch body 40 at a rotational speed less than that of the driven shaft 34.

The second synchronous clutch 38 is similarly constructed but with the substantial difference that it reacts to differences in rotational speed in the reverse manner to the first synchronous clutch 36. The second synchronous clutch 38 comprises a clutch member or arbor 60 permanently bolted to the driven shaft 34 and provided with toothed engagement means 62 in the form of a helically cut external gear or male spline. A secondary synchronous coupling sleeve 64 is rotatably and axially slidably mounted on the clutch driven member or arbor 60 and is provided with an engine-side toothed engagement means 66 for constantly, i.e. in every possible axial positional relationship of the two synchronous coupling sleeves 44 and 64 in relationship to one another and to the clutch body 40 and the clutch arbor 60, engaging the propeller-side toothed engagement means 48 of the primary synchronous clutch sleeve 44. The toothed engagement means 66 of the secondary synchronous coupling sleeve 64 is a straight toothed external gear or male spline. The secondary synchronous coupling sleeve 64 further comprises a propeller-side toothed engagement means 68 for engaging the toothed engagement means 62 of the clutch member or arbor 60. The toothed engagement means 68 of the secondary synchronous coupling sleeve 64 is therefore a helically cut internal gear or female spline.

A further actuating fork or throw-out yoke 70 engages grooved bearing means provided on the exterior of the secondary synchronous coupling sleeve 64 and is connected to a lever arm 72 mounted in a fixed pivot.

A secondary synchronizing hub 74 is rotatably and axially slidably mounted on the clutch member or arbor 60. It engages a helically toothed ring 76 on the clutch member or arbor 60 and is connected to the secondary synchronous coupling sleeve 64 to commonly slide therewith. It can further be fixed against mutual rotation to the secondary synchronous coupling sleeve 64 by a secondary ratchet drive 78. This rotational clutch or coupling action is effected when the primary synchronous coupling sleeve 44 drives the secondary synchronous coupling sleeve 64 at a rotational speed which is higher than that of the clutch member or arbor 60.

A locking or engagement ring 80 is mounted on the clutch member or arbor 60 to be axially slidable but not mutually rotatable therewith. The locking ring 80 is preloaded by springs 82 urging it in the direction of the clutch member or body 40 and urging it to engage externally toothed engagement means 84 provided on the secondary synchronous coupling sleeve 64 and thereby lock or jam the coupling sleeve in its engaged position as shown in FIGS. 2a and 2c. The locking or engagement ring 80 can be retracted or disabled by hydraulic pressure.

Both synchronous coupling sleeves 44 and 64 are provided with mutually opposing contact or pressure faces 86 and 88 which prevent both synchronous coupling sleeves from simultaneously disengaging from their associated clutch body 40 respectively clutch arbor 60.

Both synchronous coupling sleeves 44 and 64 are connected with a monitoring and control unit 90 by means of two lever arms 52 and 72. The control unit 90 can be switched between a mode of operation of the clutch arrangement 30 suited for normal forward propulsion (switch position I) and a mode of operation for maneuvering (switch position II) by means of a switch 92. The switch 92 controls two electromagnetic valves 94 and 96 as can be seen from FIGS. 3a through 3j. These two electromagnetic valves 94 and 96 are directly connected to an oil pump 98. The electromagnet valve 94 directly controls a 6-way valve 100 and through this a 4-way valve 102. The 4-way valve 102 is, in turn, connected with a servo mechanism 104 through a reversing valve 106 controlled by the servo mechanism. The servo-mechanism 104 is a cylinder and piston unit whose piston is connected to the lever arm 52 and can be latched in the engaged position of the first synchronous clutch 36 by means of a hydraulically actuated latch 108.

This 6-way valve 100 is also connected to a manifold valve 112 through a limit valve 110. The manifold valve 112 is mechanically connected to the lever arm 72 and controls, according to the position of the lever arm, the flow to a limit valve 114 associated with the lever arm 52.

The electromagnetic valve 96 controls the locking or engagement ring 80.

In the following, the various modes of operation permitted by the clutch arrangement 30 of the reversing drive unit for marine vessels shown in FIG. 1 will be described:

Normal Forward Propulsion

Both synchronous clutches 36 and 38 of the clutch arrangement 30 are engaged and the secondary synchronous coupling sleeve 64 is locked to the clutch member or arbor 60. The transmission of torque in forward drive is therefore assured. The latch 108 shown in FIGS. 3a through 3j excludes the possibility that the primary synchronous coupling sleeve 44 be disengaged from the first clutch member or body 40 due to an erroneous selection on the hydraulic control unit.

Crash-stop

The power of the gas turbine 18 is reduced, the second synchronous clutch 38 is released by retracting locking ring 80, the guide vanes 28 of the torque converter 26 are advanced and the torque converter 26 is filled as soon as the release of the second synchronous clutch 38 is confirmed by the monitor and control unit 90. The second synchronous clutch 38 then automatically disengages.

As soon as the control unit 90 has confirmed the disengaged state of the second clutch unit 38, the guide vanes of the torque converter 26 are retracted; the propeller 10 consequently reduces its speed of rotation and finally begins to turn in reverse. The clutch arrangement 30 acts in the following manner:

As soon as the speed of rotation of the driven shaft 34 becomes slower than that of the driving shaft 32, the second synchronous clutch 38 begins to re-engage. The second synchronous coupling sleeve 64 moves, by means of the lever arm 72, the valve body of the manifold valve 112 such that pressurized oil for the disengagement of the first synchronous clutch 36 is supplied before the second synchronous clutch 38 is fully engaged. This assures that the first synchronous clutch 36 will disengage in the fully unloaded state. The primary synchronous coupling sleeve 44, in its disengagement motion, pushes the secondary synchronous coupling sleeve 64 through the contact surfaces 86 and 88 fully into the engaged position and firmly holds it there.

While the propeller 10 reduces its speed of rotation and subsequently begins to turn in reverse, the primary ratchet drive 58 ratchets and remains ready to re-engage as soon as the relative speed of rotation reverses.

Maneuvering

Forward or reverse propulsion can be selected as desired by retracting and advancing guide vanes 28 of the torque converter 26. If the speed of rotation of the driven shaft 34 remains below that of the driving shaft 32, the first ratchet drive 58 ratchets.

If, however, the speed of rotation of the driven shaft 34 increases above that of the driving shaft 32, the first synchronous clutch 36 engages while the second synchronous clutch 38 disengages and assists the first synchronous clutch 36 in fully engaging. Now the speed of rotation of the driven shaft 34 can be increased above that of the driving shaft 32 as desired. The secondary ratchet drive 78 ratchets and remains ready to re-engage as soon as the relative speed of rotation has reversed again.

If the speed of rotation of the driven shaft 34 drops below that of the driving shaft 32 again, the second synchronous clutch 38 automatically re-engages and effects, by means of the monitoring and control unit 90, the disengagement of the first synchronous clutch 36. The procedure described above under the heading "Crash Stop" is repeated. It is therefore possible to maneuver the vessel without having to intervene in the operation of the clutch arrangement 30.

From "Maneuvering" To "Normal Forward Propulsion"

On the command "full speed ahead", the switch 92 is moved to position I, which of course can also be done automatically when a certain criterion is preselected on an electrical control stand. At the time the switch 92 is placed in position I, two different states of operation may prevail in the reversing drive unit of the vessel:

(a) The driving shaft 32 is rotating faster than the propeller 10, i.e. the second synchronous clutch 38 is engaged but not latched while the first synchronous clutch 36 is disengaged and the primary ratchet drive 58 is ratcheting. The propeller 10 is either turning backward or slowly forward. In this case, the following procedure is envisioned:

The second synchronous clutch 38 is locked by latching ring 80.

The guide vanes 28 of the torque converter 26 are fully advanced, the shaft of the propeller 10 accelerates forward and the power of the gas turbine 18 is slowly increased until the driven shaft 38 begins to rotate faster than the driving shaft 32. At this moment the first synchronous clutch 36 engages without the second synchronous clutch 38 disengaging.

As soon as the monitoring and control unit 90 confirms that the first synchronous clutch 36 has engaged, the torque converter 26 is drained. The driving torque is transferred from the supplementary drive stage 16 to the clutch arrangement 30, i.e. the second synchronous clutch 38 transmits the propulsion force, thereby unloading the latching or engagement ring 80. The first synchronous clutch 36 is latched by means of the latch 108, thereby preventing an erroneous hydraulic disengagement.

(b) The driving shaft 32 is turning slower than the driven shaft 34; consequently, the second synchronous clutch 38 is disengaged and the secondary ratchet drive 78 is ratcheting while the first synchronous clutch 36 is engaged and hydraulically held in engagement. In this case, the following sequence is envisioned:

The latch 108 associated with the first synchronous clutch 36 is engaged.

The latching or engagement ring 80 associated with the second synchronous clutch 38 is activated.

The torque converter 26 is drained and the speed of rotation of the driven shaft 34 begins to fall below that of the driving shaft 32.

At this moment the second synchronous clutch 38 engages; spring pressure engages the locking or engaging ring 80 and the entire reversing drive unit is once again prepared for full forward propulsion.

Figure 4:
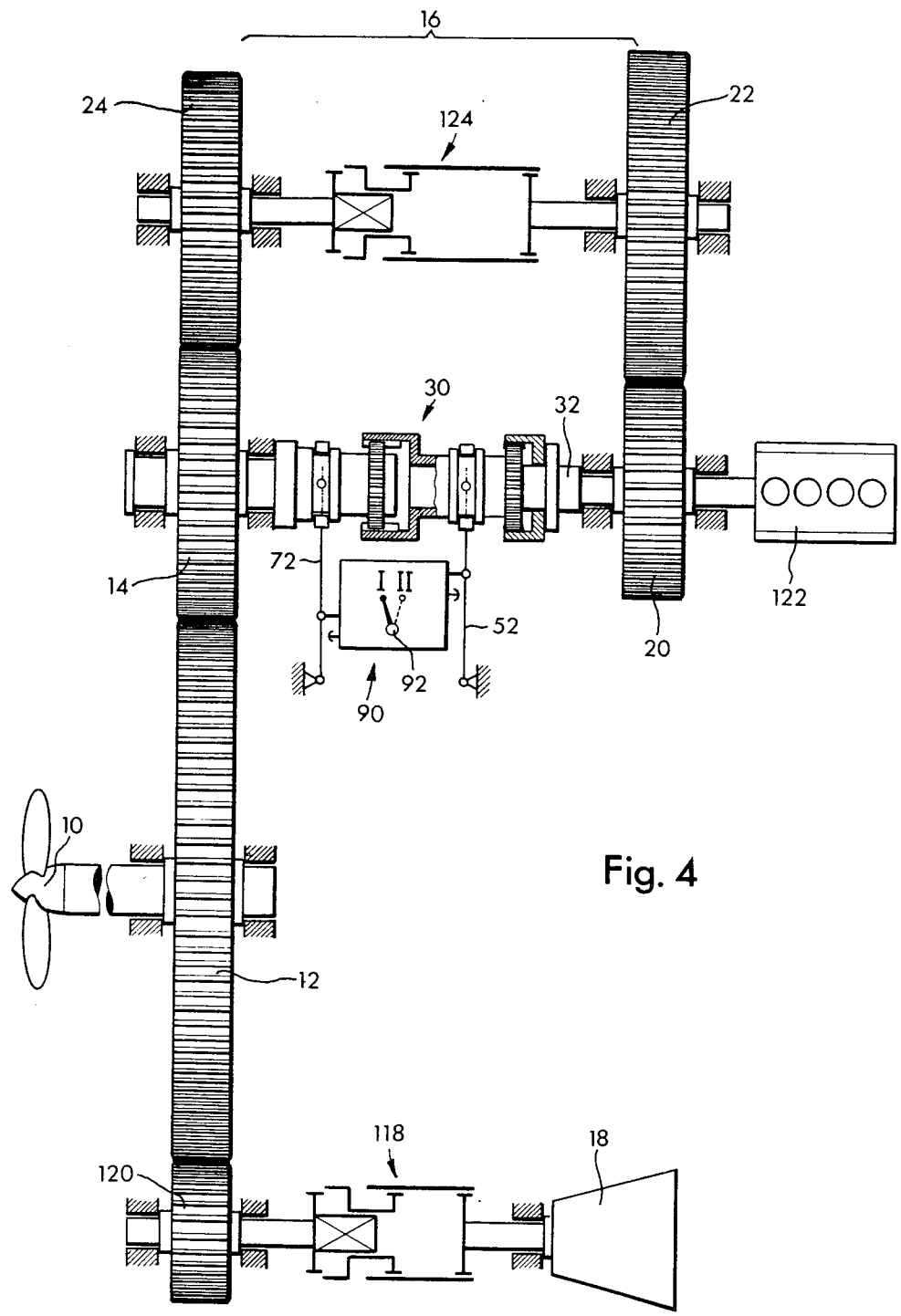
FIG. 4 shows a CODAG arrangement of a drive unit for a marine vessel.
Figure 5:
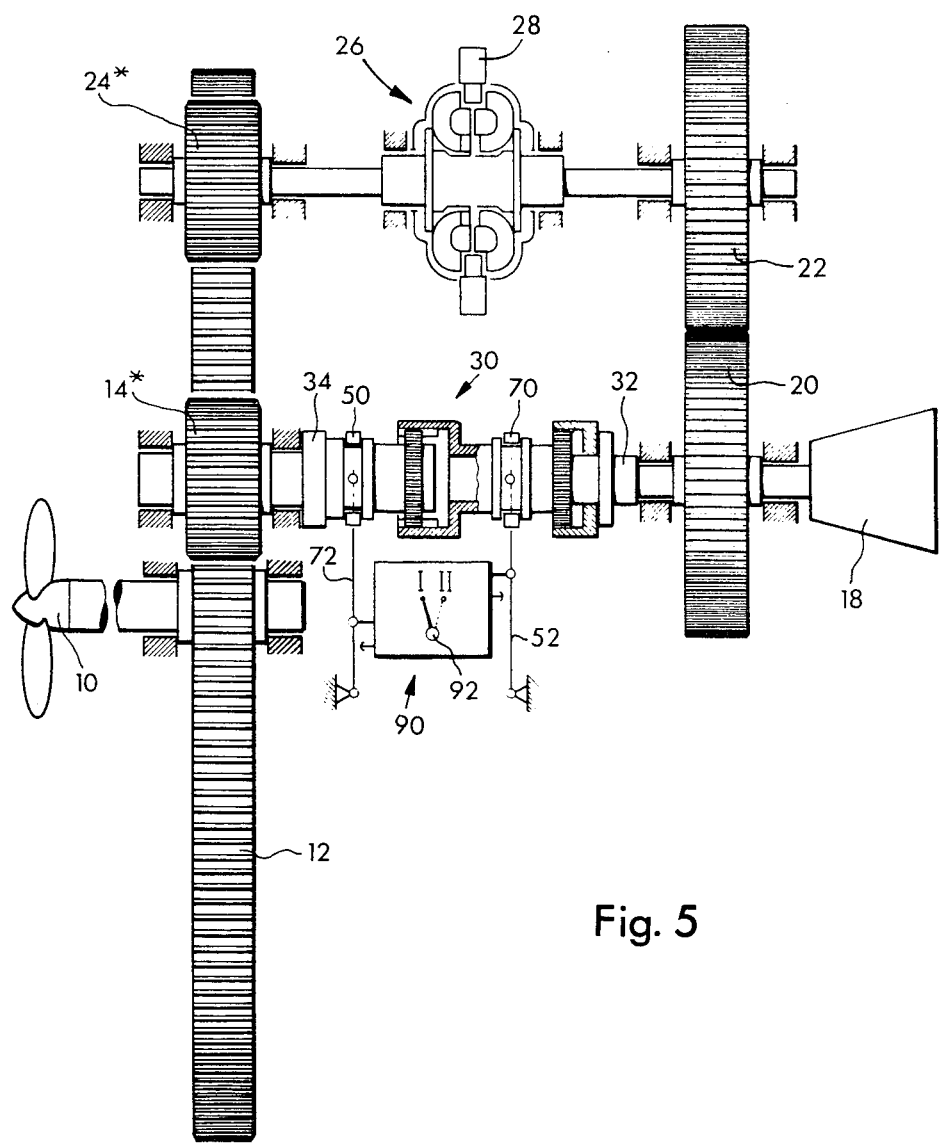
FIG. 5 shows an alternate embodiment of FIG. 1.

The CODAG drive unit according to FIG. 4 differs from the reversing drive unit shown in FIG. 1 in that the gas turbine 18 is connected to a pinion gear 120 through a single synchronous clutch 118. The pinion 120 meshes with the main drive gear 12. The driving shaft 32 is permanently coupled with a diesel engine 122 and the supplementary drive stage 16 comprises a further automatic synchronous toothed clutch 124 instead of the torque converter 26. The synchronous clutch 124 only engages when the diesel engine 122 alone is driving the ship.

In the latter case, the supplementary drive stage provides a greater gear reduction:

$$i_{D1} = \frac{Z_{12}}{Z_{24}} \times \frac{Z_{22}}{Z_{20}}$$

On the other hand, a lower gear reduction is provided when the gas turbine 18 provides propulsion power jointly with the diesel engine 122:

$$i_{D2} = \frac{Z_{12}}{Z_{14}}$$

In the arrangement according to FIG. 4 the following operating states are envisioned:

Mode 1: the diesel engine 122 and the gas turbine 18 jointly drive full speed ahead.

The synchronous clutch 118 is engaged.

The self synchronizing toothed clutch 124 is disengaged and its ratchet gear ratchets due to the relative speed of rotation between the gears 24 and 22 corresponding to the ratio of the respective numbers of teeth on each gear.

The clutch arrangement 30: the control lever of the switch 92 is in position I; the clutch arrangement is in the position shown in FIG. 2a.

Mode 2: the diesel engine 122 is driving the ship alone (dead slow):

The gas turbine 18 is stopped and the associated synchronous clutch 118 is disengaged, i.e. its ratchet drive is ratcheting at a relative speed of rotation equal to the speed of rotation of the shaft of the gear 120.

The automatically synchronizing toothed clutch 124 is engaged.

The switch lever of the switch 92 is in switch position II; the latch of the clutch arrangement 30 is in the unlatched condition.

The clutch arrangement 30 is in the control state shown in FIG. 2c. The clutch is ratcheting on its ratchet drive 58 at a relative speed of rotation corresponding to the ratio of the number of teeth on the gears 14 and 20.

Mode 3: the gas turbine 18 is driving the ship alone:

The diesel engine 122 is stopped; the associated automatically synchronizing toothed clutch 124 is disengaged, i.e. its ratchet drive is ratcheting at a relative speed of rotation equal to the speed of rotation of the gear 24.

The synchronous clutch 118 is engaged.

The switch lever of the switch 92 is in the switch position II; the latch of the clutch arrangement is in the unlatched condition.

Figure 2B:
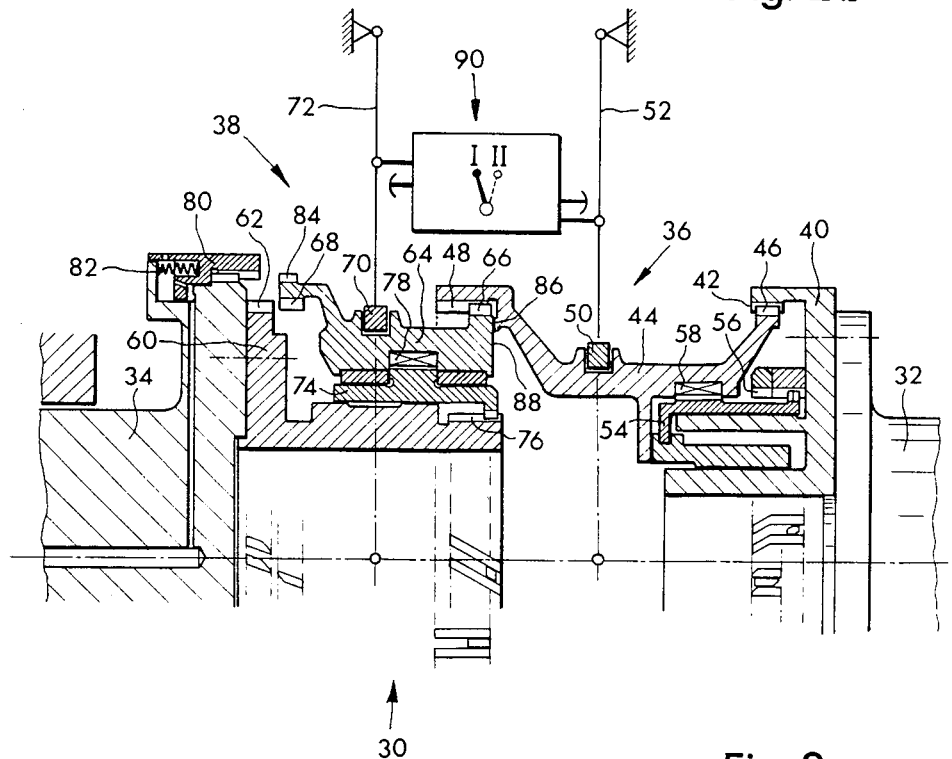
Figure 2C:
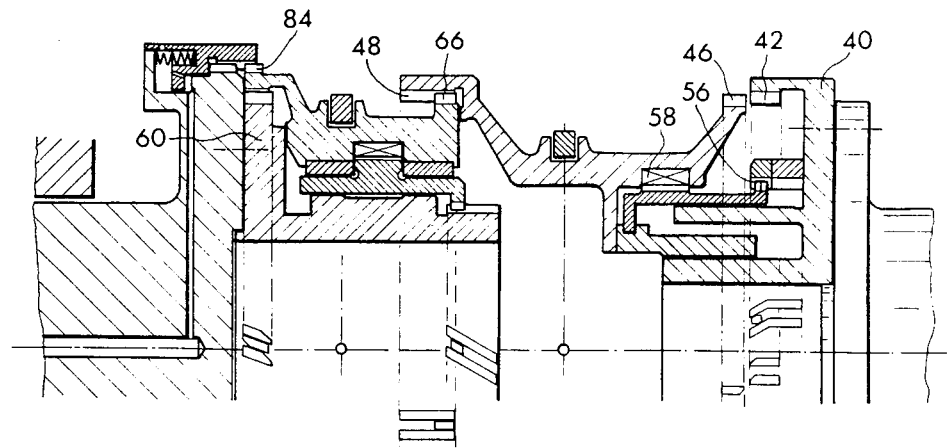
Figure 3A:
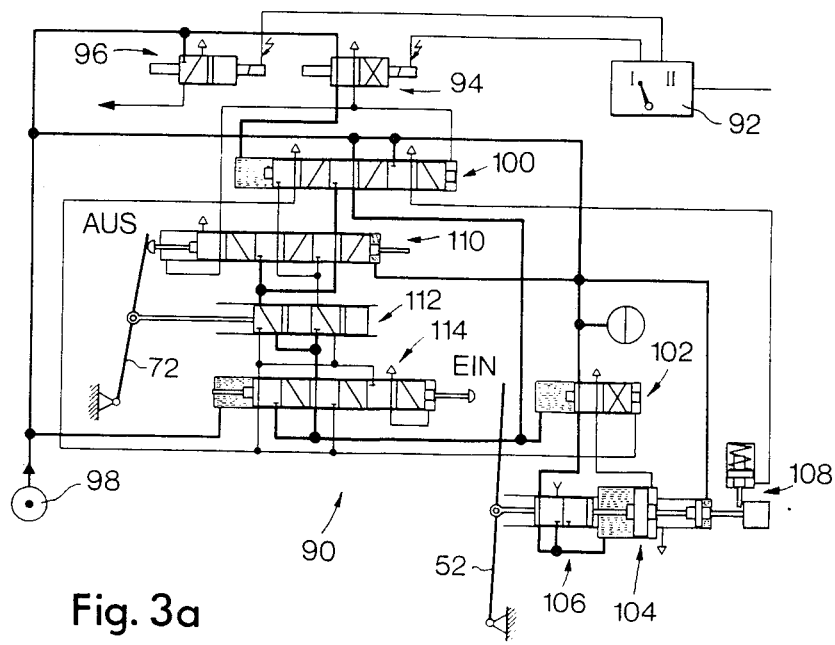
FIGS. 3a through 3j diagramatically illustrate a monitoring and regulating control unit for the clutch device.
Figure 3B:
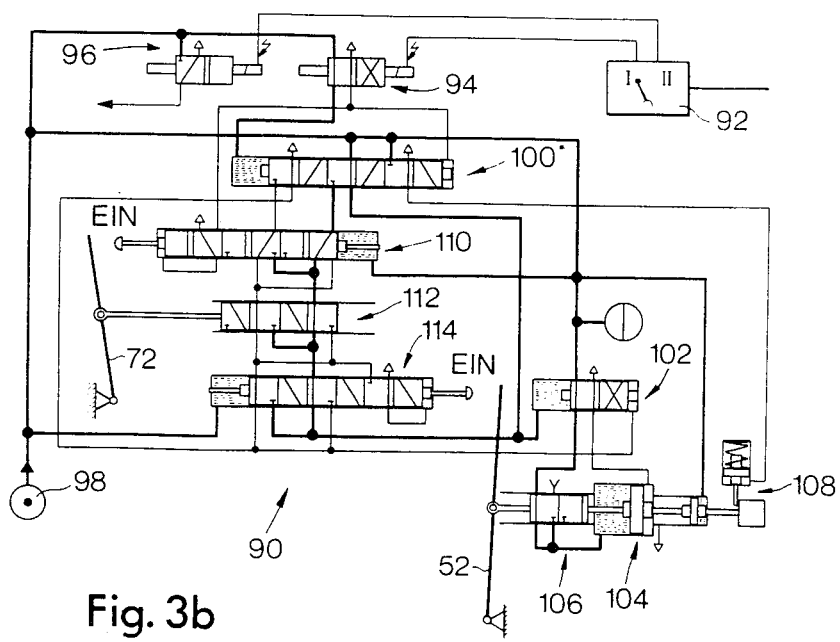
Figure 3C:
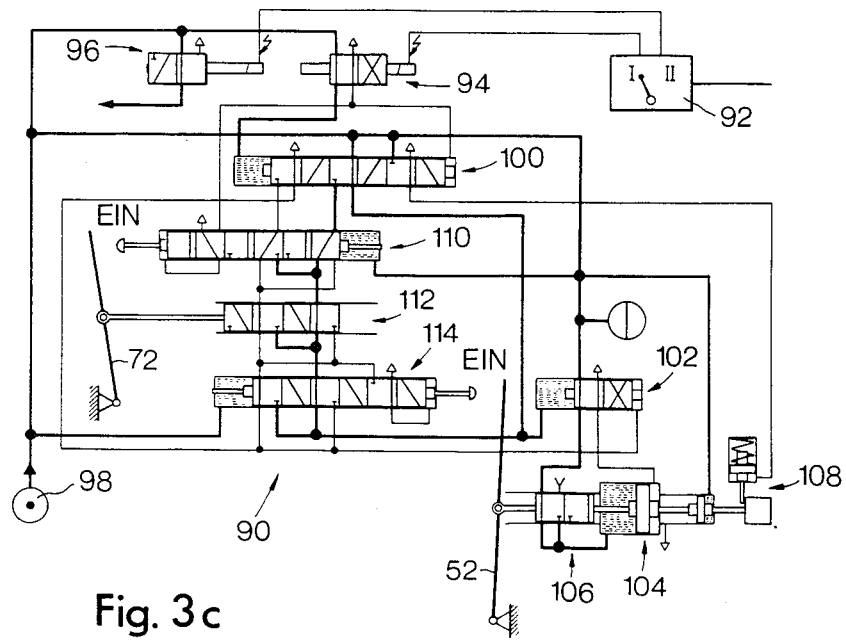
Figure 3D:
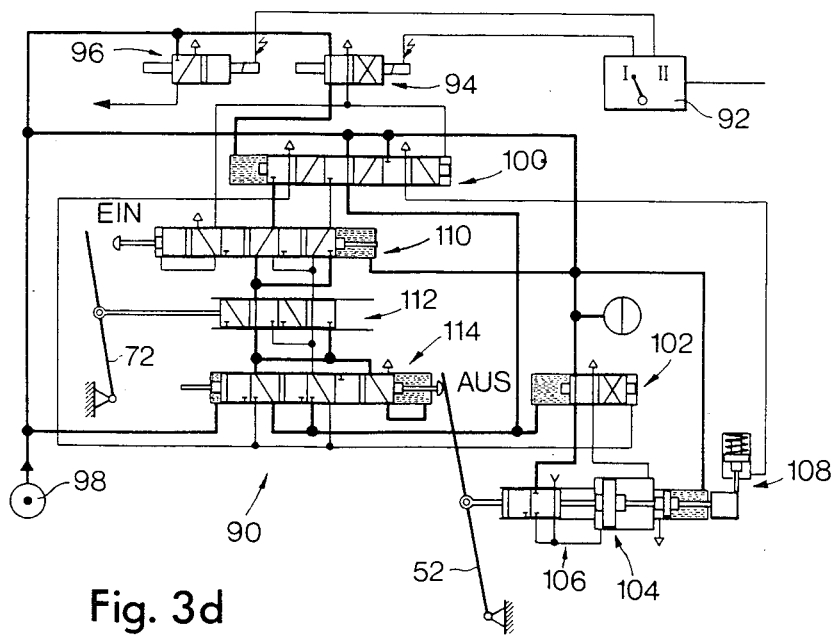
Figure 3E:
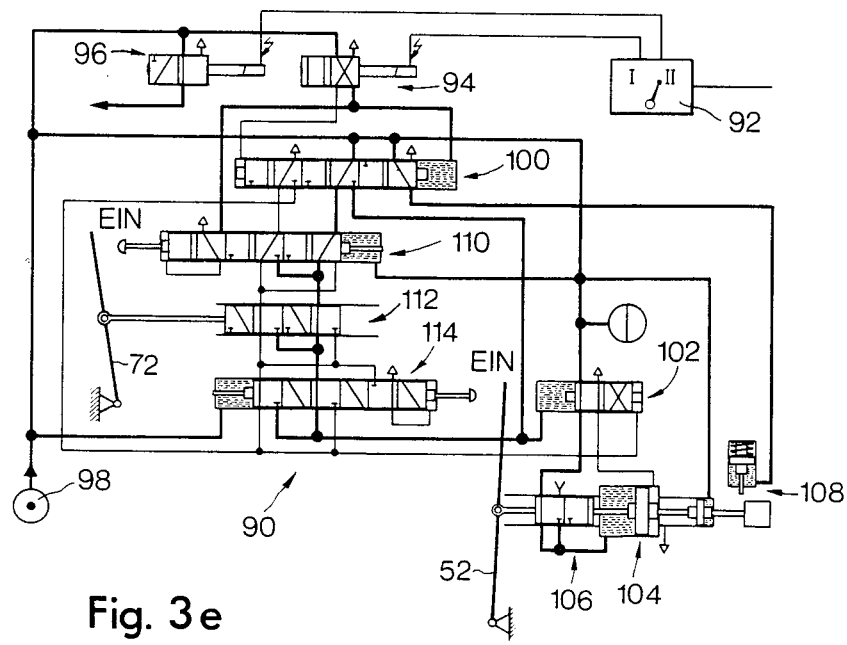
Figure 3F:
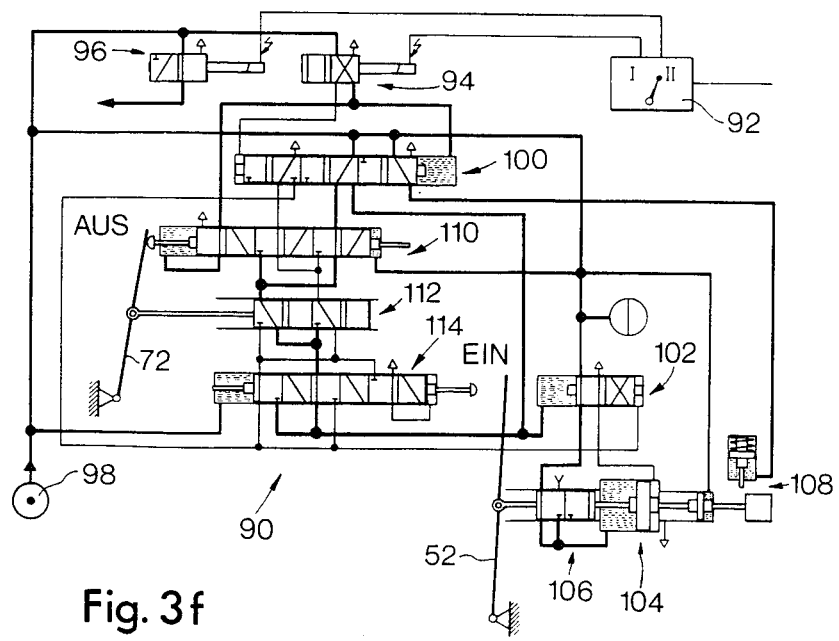
Figure 3G:
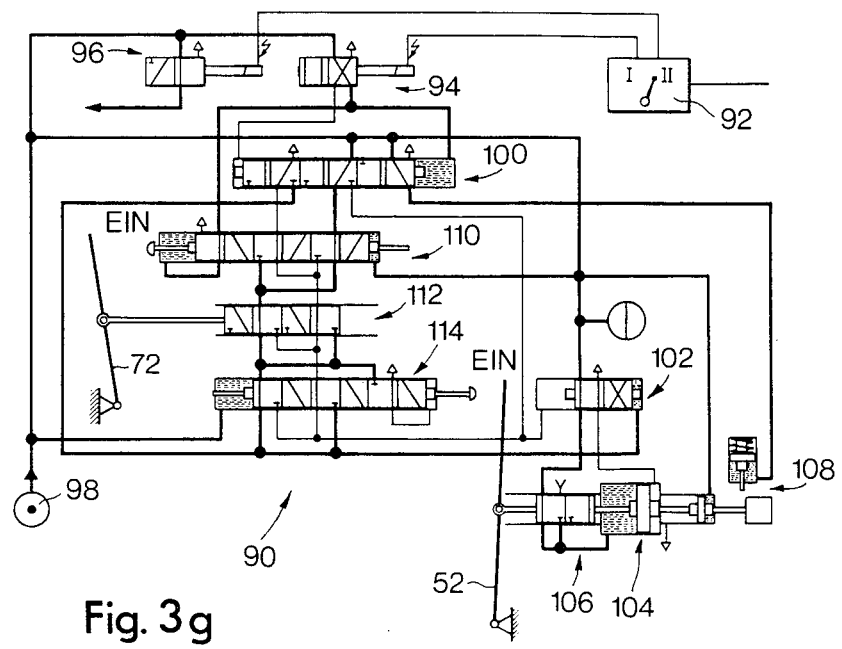
Figure 3H:
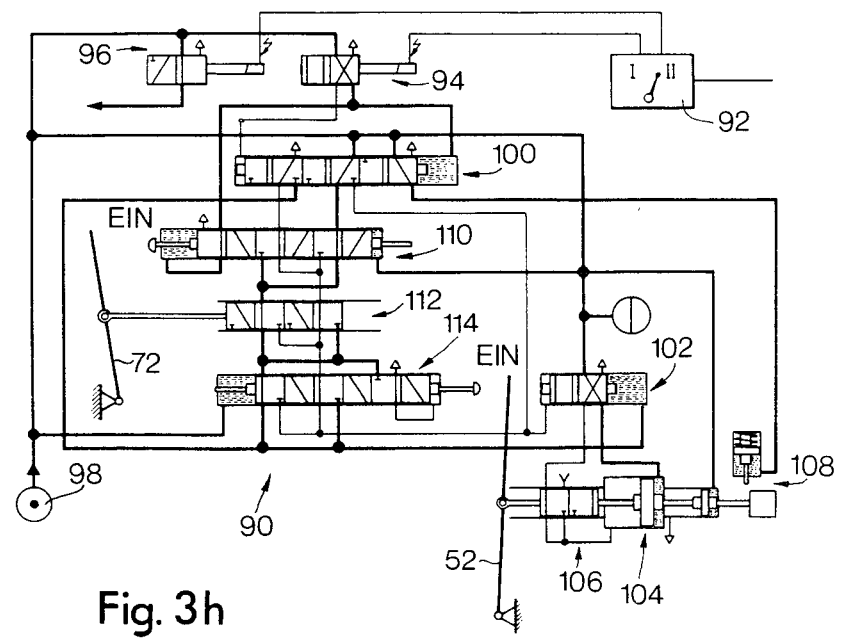
Figure 3:
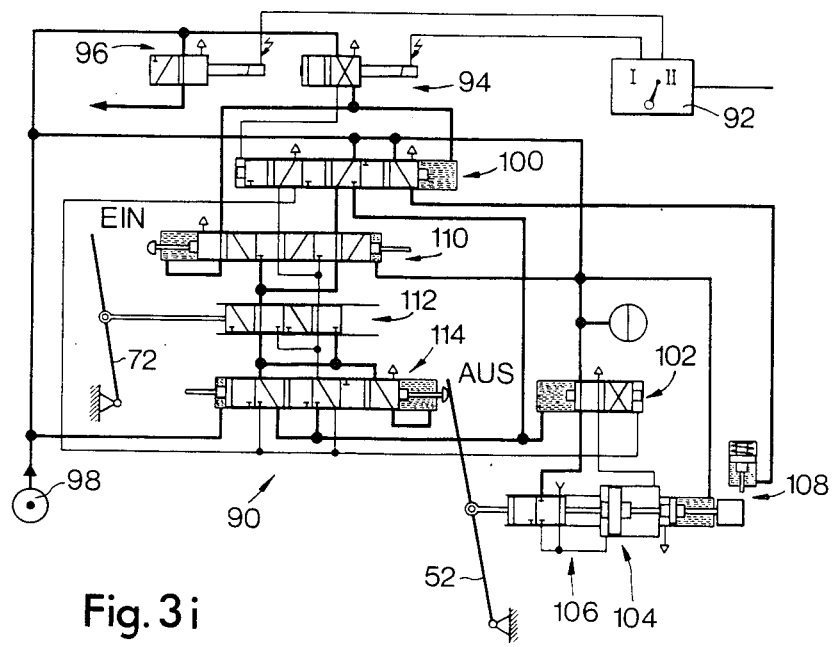
Figure 3:
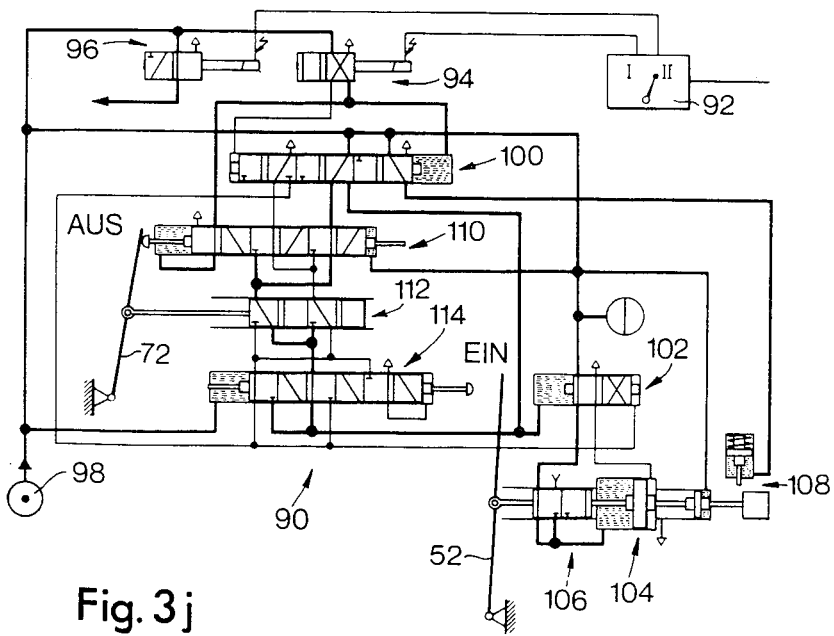

The clutch arrangement 30 is in the control state shown in FIG. 2b and the secondary ratchet drive 78 is ratcheting at relative speed of rotation equal to the speed of rotation of the gear 14.

In the possible operating states explained above (mode 1 through mode 3) the following changes of state are provided:

From mode 1 to mode 2

The control lever of the switch 92 is moved to position II which unlatches the clutch arrangement 30.

The power of the diesel engine 122 is reduced. The clutch arrangement 30 assumes the position shown in FIG. 2b.

A monitoring signal appears.

The speed of rotation of the diesel engine is slowly increased again and the power of the gas turbine 18 is reduced. The clutch arrangement begins to move in the direction of the position shown in FIG. 2a.

When the position shown in FIG. 2a has been partially reached, hydraulic fluid is supplied to the actuating side of the operating piston of the clutch arrangement 30 (the latter is disengaged toward the right and fully engaged toward the left).

A monitoring signal appears.

The gas turbine is turned off.

The synchronous clutch 118 disengages.

The speed of rotation of the diesel engine 122 is increased again.

The self synchronizing toothed clutch 124 engages.

The diesel engine 122 is switched to full power (dead slow).

From mode 2 to mode 1

The control lever of the switch 92 is moved to position I, which latches the clutch arrangement 30.

The gas turbine 18 is started and brought up to operating speed; the synchronous clutch 118 engages.

The power of the gas turbine 18 is increased; the self synchronizing toothed clutch 124 disengages and the pinion gear 14 rotates faster.

When the speed of rotation of the pinion gear 14 has become greater than that of the first gear 20, the clutch arrangement 30 engages on the right side (it remains engaged on the left side).

A monitoring signal appears.

The diesel engine 122 and the gas turbine 18 are jointly brought to full load.

From mode 1 to mode 3

The control lever of the switch 92 is moved to position II, which unlatches the clutch arrangement 30.

The diesel engine 122 is stopped; the clutch arrangement 30 disengages on the left while it remains engaged on the right.

From mode 3 to mode 1

The control lever of the switch 92 is moved to position I, causing the latching or engagement ring 80 to move into the latching position.

The diesel engine 122 is brought up to operating speed; the clutch arrangement 30 engages on the left as soon as the speed of rotation of the first gear 20 becomes greater than the speed of rotation of the pinion gear 14 and is latched in position (the clutch arrangement 30 remains engaged on the right).

From mode 2 to mode 3

The control lever of the switch 92 remains in position II.

The gas turbine 18 is brought up to operating speed; the synchronous clutch 118 engages.

The speed of rotation of the gas turbine 18 is further increased and the power of the diesel engine is reduced; the self synchronizing toothed clutch 124 disengages.

A monitoring signal appears.

The speed of rotation of the diesel engine 122 is further reduced so that the clutch arrangement 30 engages on the left and disengages on the right.

The diesel engine 122 is stopped.

The gas turbine 18 is brought up to operating speed.

From mode 3 to mode 2

The control lever of the switch 92 remains in position II.

The diesel engine 122 is brought up to operating speed.

The speed of rotation of the gas turbine 18 is reduced; the clutch arrangement 30 engages on the left and simultaneously disengages on the right.

The speed of rotation of the diesel engine is further increased; the self synchronizing toothed clutch 124 engages.

A monitoring signal appears.

The gas turbine 18 is stopped; the synchronizing clutch 118 disengages.

The diesel motor is brought up to operating speed.

While there are shown and described present preferred embodiments of the invention, it is to be distinctly understood that the invention is not limited thereto, but may be otherwise variously embodied and practiced within the scope of the following claims. Accordingly,

What we claim is:

1. A clutch device, especially a clutch device for marine vessel propulsion systems, comprising:
   a driving shaft;
   a driven shaft;
   synchronous clutch means disposed between said driving shaft and said driven shaft;
   a first synchronous clutch releasably engaging said driving shaft;
   said synchronous clutch means defining a second synchronous clutch releasably engaging said driven shaft and cooperating with said first synchronous clutch;
   said first synchronous clutch comprising self-operative engagement means responsive to relative rotational speeds for engaging said first synchronous clutch to said drive shaft such that said first synchronous clutch automatically engages when the rotational speed of the driven shaft begins to exceed that of the driving shaft; and
   the second synchronous clutch comprising self-operative engagement means responsive to relative rotational speeds for engaging said second synchronous clutch to said driven shaft such that said second synchronous clutch automatically engages when the rotational speed of the driving shaft begins to exceed that of the driven shaft.

2. A clutch device, especially a clutch device for marine vessel propulsion systems, comprising:
   a driving shaft;
   a driven shaft;
   synchronous clutch means disposed between said driving shaft and said driven shaft;
   a first synchronous clutch releasably engaging said driving shaft;
   said synchronous clutch means defining a second synchronous clutch releasably engaging said driven shaft and cooperating with said first synchronous clutch;
   said first synchronous clutch automatically engages when the rotational speed of the driven shaft begins to exceed that of the driving shaft;
   the second synchronous clutch automatically engages when the rotational speed of the driving shaft begins to exceed that of the driven shaft;
   said first synchronous clutch comprising:

a synchronous clutch driving body mounted on the driving shaft and provided with toothed engagement means;

a primary synchronous coupling sleeve provided at a side thereof nearest the driving shaft with toothed engagement means for engaging the toothed engagement means of said synchronous clutch driving body and at a side thereof nearest the driven shaft with further toothed engagement means;

a primary synchronizing device arranged between the primary synchronous coupling sleeve and the synchronous clutch driving body;

said primary synchronizing device having a primary ratchet drive and a primary synchronizing hub body;

said second synchronous clutch comprising:

a synchronous clutch driven arbor mounted on the driven shaft and provided with toothed engagement means;

a secondary synchronous coupling sleeve provided at a side thereof nearest the driven shaft with toothed engagement means for engaging the toothed engagement means of said synchronous clutch driven arbor and at a side thereof nearest the driving shaft with further toothed engagement means;

a secondary synchronizing device arranged between the secondary synchronous coupling sleeve and the synchronous clutch driven arbor;

said secondary synchronizing device having a secondary ratchet drive and a secondary synchronizing hub body; and the toothed engagement means of the secondary synchronous coupling sleeve nearest the driving shaft being in constant axially sliding engagement with the toothed engagement means of the primary synchronous coupling sleeve nearest the driven shaft.

3. The clutch device as defined in claim 2, wherein:
the toothed engagement means of the primary synchronous coupling sleeve nearest the driven shaft comprises a straight toothed spline and the toothed engagement means of the primary synchronous coupling sleeve nearest the driving shaft comprises a straight toothed spline;

the toothed engagement means of the secondary synchronous coupling sleeve nearest the driving shaft comprises a straight toothed spline and the toothed engagement means of the secondary synchronous coupling sleeve nearest the driven shaft comprises a helically toothed spline;

a servo-mechanism operatively associated with said primary synchronous coupling sleeve; and said servo-mechanism effecting full engagement of the primary synchronous coupling sleeve in the toothed engagement means of the synchronous clutch driving body.

4. The clutch device as defined in claim 2, wherein:
both synchronous coupling sleeves comprise mutually opposing contact surfaces which mutually prevent both synchronous coupling sleeves from simultaneously disengaging from the synchronous clutch driving body and the synchronous clutch driven arbor.

5. The clutch device as defined in claim 4, wherein:
the toothed engagement means of the primary synchronous coupling sleeve nearest the driven shaft comprises a straight toothed spline and the toothed engagement means of the primary synchronous coupling sleeve nearest the driving shaft comprises a straight toothed spline;

the toothed engagement means of the secondary synchronous coupling sleeve nearest the driving shaft comprises a straight toothed spline and the toothed engagement means of the secondary synchronous coupling sleeve nearest the driven shaft comprises a helically toothed spline;

a servo-mechanism operatively associated with said primary synchronous coupling sleeve; and said servo-mechanism effecting full engagement of the primary synchronous coupling sleeve in the toothed engagement means of the first synchronous clutch driving body.

6. A clutch device, especially a clutch device for marine vessel propulsion systems, comprising:
a driving shaft supplying propulsion power from an engine;

a driven shaft transmitting propulsion power to a propeller drive mechanism;

synchronous clutch means disposed between said driving shaft and said driven shaft;

said synchronous clutch means comprising:
a first synchronous clutch releasably engaging said driving shaft;

a second synchronous clutch releasably engaging said driven shaft and slidably and non-releasably engaging said first synchronous clutch;

said first synchronous clutch comprising self-operative engagement means responsive to relative rotational speeds for engaging said first synchronous clutch to said drive shaft such that said first synchronous clutch automatically engages when the rotational speed of the driven shaft begins to exceed that of the driving shaft; and the second synchronous clutch comprising self-operative engagement means responsive to relative rotational speeds for engaging said second synchronous clutch to said drive shaft such that said second synchronous clutch automatically engages when the rotational speed of the driving shaft begins to exceed that of the driven shaft.

* * * * *